United States Patent [19]

Wako et al.

[11] Patent Number: 4,468,681
[45] Date of Patent: Aug. 28, 1984

[54] ELECTROSTATIC RECORD IMAGE FORMING METHOD

[75] Inventors: Shoji Wako; Hidemasa Todo, both of Kanagawa, Japan

[73] Assignee: Fuji Xerox Co., Ltd., Tokyo, Japan

[21] Appl. No.: 342,566

[22] Filed: Jan. 25, 1982

[30] Foreign Application Priority Data

Jan. 27, 1981 [JP] Japan .................................. 56-10643

[51] Int. Cl.³ ............................................ G01D 15/06
[52] U.S. Cl. ............................... 346/153.1; 355/3 CH
[58] Field of Search .................. 346/153.1, 155, 160.1; 355/3 CH; 354/5

[56] References Cited

U.S. PATENT DOCUMENTS 3,527,941  9/1970  Culhane et al. ................. 355/3 CH

FOREIGN PATENT DOCUMENTS 47-6941   4/1972  Japan .
51-38351  10/1972 Japan .

Primary Examiner—Thomas H. Tarcza
Attorney, Agent, or Firm—Sughrue, Mion, Zinn, Macpeak, and Seas

[57] ABSTRACT

The precharging of the surface of an electrostatic recording medium is done sufficiently ahead of the electrode assembly so that all non-uniformities in charge distribution have time to settle out. Preferably, the precharge potential across the recording medium at the electrode assembly differs by no more than approximately 10 volts.

4 Claims, 8 Drawing Figures

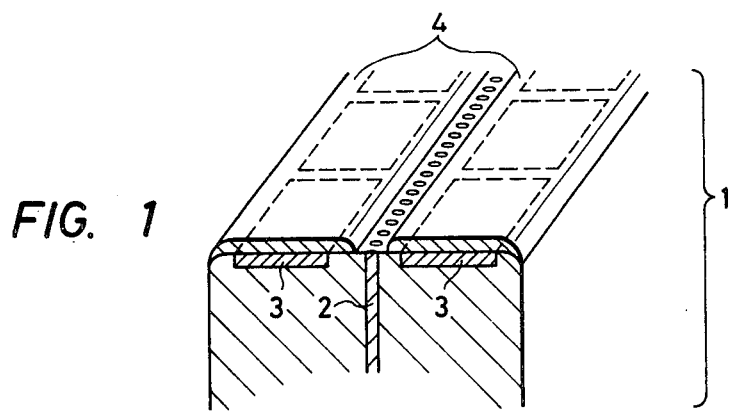
FIG. 1
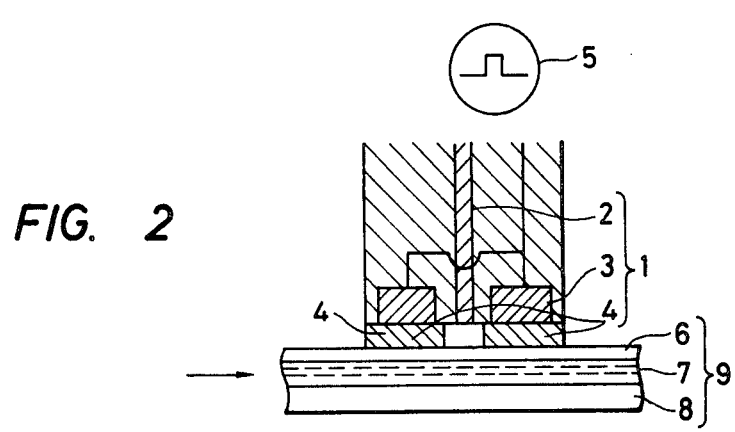
FIG. 2
FIG. 3
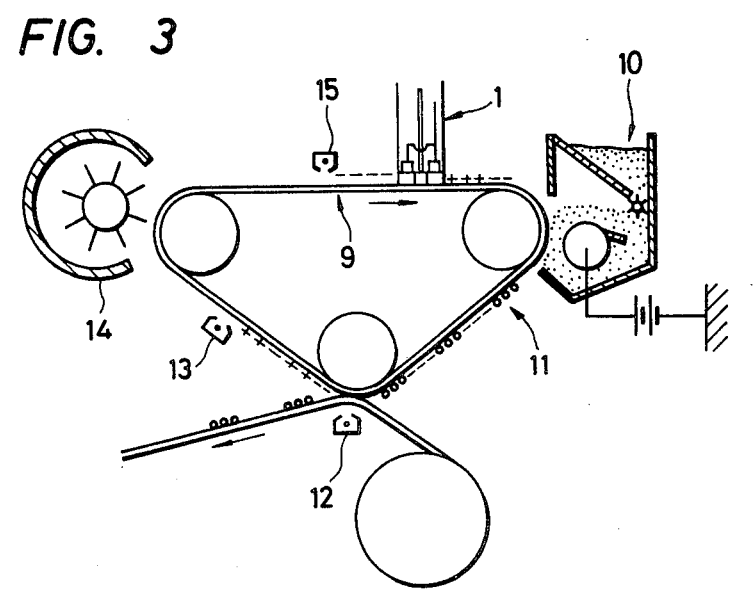

ELECTROSTATIC RECORD IMAGE FORMING METHOD

BACKGROUND OF THE INVENTION

This invention relates to electrostatic recording methods in which recording is carried out with a multi-stylus electrode assembly or the like, and more particularly to an electrostatic recording method of forming an electrostatic latent image with a multi-stylus electrode assembly on a recording medium the surface of which is preliminarily charged, in which the recording medium is charged uniformly.

An electrostatic recording method has been known in the art in which signal voltages are applied to an array of charging electrodes insulated electrically from one another to form an electrostatic latent image on a recording medium such as an electrostatic recording sheet, and the latent image thus formed is developed with toner powder or the like and is then fixed. Furthermore, Japanese Patent Application Laid-Open No. 6941/1972 has disclosed a method in which, after a recording sheet is uniformly charged in advance at a predetermined potential, the discharge electrodes of the aforementioned multi-needle electrode assembly are grounded according to an image signal to partially erase the charges on the recording medium in correspondence to the image, and the resultant image is developed with toner or the like and is then fixed.

The latter method in which the recording medium is uniformly charged in advance and is then discharged is disadvantageous in that it requires a number of drivers and is high in manufacturing cost, and in that it is difficult to uniformly discharge the recording medium. Therefore, the firstly described method in which signal voltages are applied to the charging electrodes is generally employed at the present time. A device for applying the signal voltages has been disclosed by Japanese Patent Application Publication No. 38531/1976.

In such a device, auxiliary electrodes are provided at certain intervals on one surface of a block-shaped multi-needle electrode array. Only the auxiliary electrodes required for printing are driven, so that electric discharge is caused between the charging electrodes and the auxiliary electrodes, by applying necessary voltage to generate electric charges, and the electric charges thus generated are held on the recording medium. The above-described electrode assembly will hereinafter be referred to as "a Gould type multi-needle electrode assembly".

Where the polarity of the charging electrodes is positive, it is necessary to apply more than +350 V to the charging electrodes and more than −350 V to the auxiliary electrodes; that is, it is necessary to apply more than 700 V in total across the charging electrodes and the auxiliary electrodes.

In the method in which positive signal voltages are applied to the charging electrodes as described above, if the dot density of the charging electrodes is increased, inter-stylus discharge is liable to occur. For instance in the case of a dot density on the order of 8 dots/mm, inter-stylus discharge is liable to take place with about +350 V or higher. This is a serious problem in the maintenance of the multi-stylus electrode assembly.

Further, there is no true electric charge in the background portion of the recording layer. Therefore, when an electrostatic latent image formed on the recording medium is developed, for instance, with toner, the toner is liable to stick onto the background portion, thus making the latter dirty.

SUMMARY OF THE INVENTION

Accordingly, an object of this invention is to provide a method in which a multi-stylus electrode assembly, having auxiliary electrodes covered with a paint layer serving as a gap holding and insulating member, is run along a recording medium consisting of a recording layer, an intermediate resistance layer and a base layer in such a manner that the paint layer is kept in contact with the recording layer to from an electrostatic latent image, and wherein, according to the invention, the recording layer is uniformly charged in advance.

Briefly, this is achieved in the preferred embodiment by precharging the recording layer a sufficient distance upstream of the electrode assembly so that, at a selected travelling speed, the irregularities in surface potential across the width of the recording layer will have sufficient time to settle out. The desirable combination of distance L and travelling speed v can be empirically determined and will vary with the resistance of the recording layer and the potentials maintained at the sides of the recording layer.

BRIEF DESCRIPTION OF THE DRAWINGS

In the drawings:

FIG. 1 is a schematic diagram showing a Gould type multi-stylus electrode assembly employed in a method according to the invention;

FIG. 2 is an explanatory diagram showing the positional relationships between the Gould type multi-stylus electrode assembly and a recording medium;

FIG. 3 is a schematic diagram showing an ordinary image forming apparatus employing the Gould type multi-stylus electrode and a preliminary charging device in combination;

DETAILED DESCRIPTION OF THE INVENTION

The essential arrangement or environment of this invention will first be described with reference to FIGS. 1 through 5.

The potential between the charging electrodes of a Gould type multi-stylus electrode assembly may be lowered by providing true electric charges on the recording medium whose polarity is opposite to that of the charging electrodes. However, the employment of this technique for an ordinary Gould type multi-stylus electrode assembly is undesirable because the true electric charge layer acts as a kind of electrode, as a result of which ghosts are formed by portions of the charge electrodes and black stipes are formed by portions of the auxiliary electrodes. The inventors have found that preliminary charge can be achieved if paint layers 4 are provided to serve as gap holding and insulating materials on the auxiliary electrodes 3. This is described in concurrently filed and commonly assigned Application Ser. No. 342,567 corresponding to Japanese Patent Application No. 10644/81 filed Jan. 27, 1981.

Figure 4:
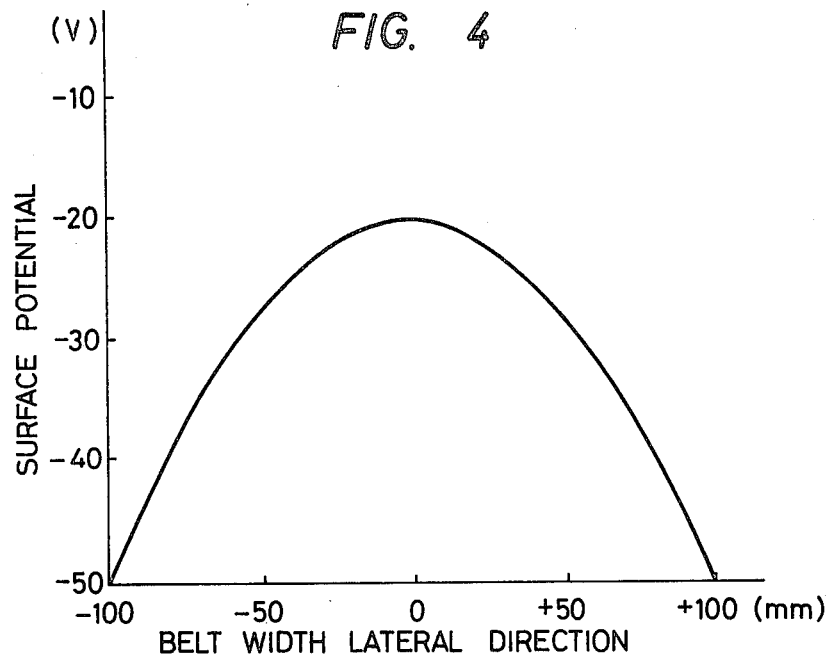
FIG. 4 is a graphical representation indicating surface potentials on a belt in its lateral direction which are provided by preliminary charging.
Figure 5:
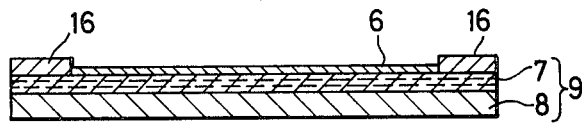
FIG. 5 is a section view of a recording medium, taken along its lateral direction.

However, it has also been found that in this technique it is difficult to uniformly charge the recording layer, and therefore in the employment of the ordinary corotoron charging method a potential difference of several tens of volts is caused in the lateral direction of the recording layer as indicated in FIG. 4.

It has been considered that the reason why the central portion and the end portion of the recording layer, as viewed in the lateral direction thereof, differ in surface potential is that since the central position and the end portion are different in distance from a grounding electrode 16 (FIG. 5), the central portion and the end portion have different time constants which are defined by the recording layer 6 and an intermediate resistance layer 7 interposed between the recording layer 6 and a base layer 8.

In the electrostatic recording method to which the present invention is directed, the Gould type multi-stylus electrode assembly having auxiliary electrodes covered with a paint layer serving as a gap holding and insulating member is employed as a signal applying device, and the signal applying device is run along a recording medium consisting of a recording layer, an intermediate resistance layer and a base layer in such a manner that the surface of the paint layer is kept in contact with the recording layer (latent image holding surface). According to the invention, a charging unit such as a corotoron or a bias roll for charging the recording layer to a polarity opposite that of the charging electrodes is provided. The problem described above wherein the potentials differ in the lateral direction is solved by a method in which, as shown in FIG. 6, the time T (=L/v) required for the recording medium to reach a multi-stylus electrode assembly 1 from a preliminary charging unit 15 (where L is the distance between the assembly 1 and the unit 15, and v is the running speed of the recording medium) is made long enough so that, even with a longer time constant for the central portion of the recording layer, a potential difference is obtained which will cause no irregular density in the development.

The invention will now be described in more detail with reference to FIG. 6 which shows a device for practicing the above-described method.

Figure 6:
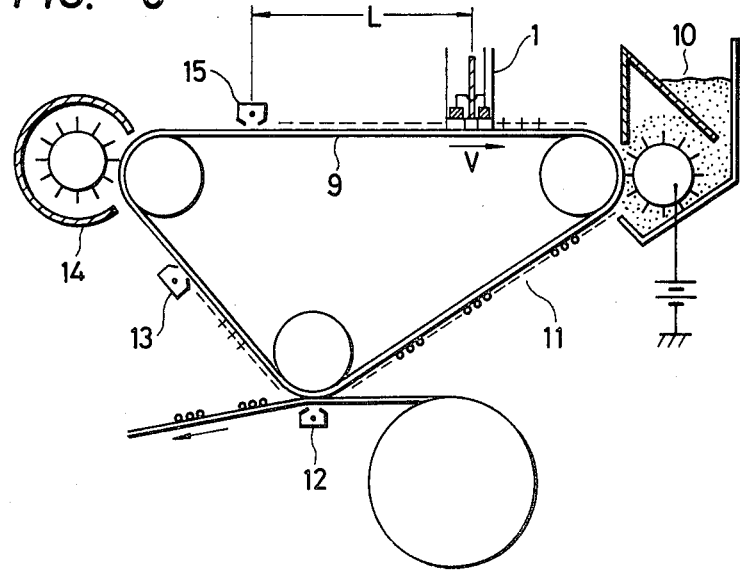
FIG. 6 is a schematic diagram showing an image forming apparatus in which the distance L between the preliminary charging device and the multi-stylus electrode assembly and the record medium feeding speed v can be changed.
Figure 7:
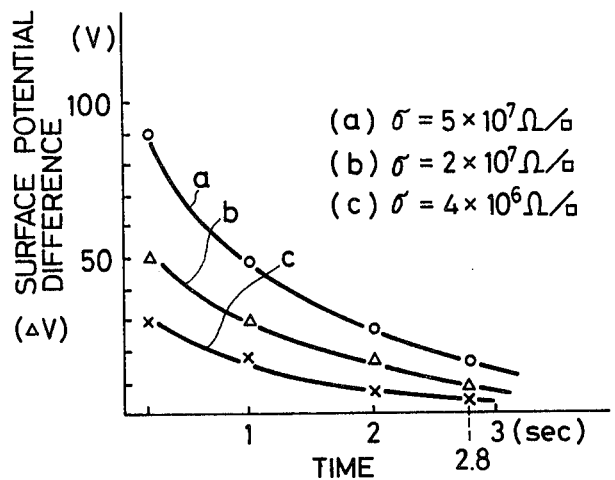
FIG. 7 is a graphical representation showing differences in surface potential with time when the resistance of the recording medium in the apparatus in FIG. 6 is varied.

In the device shown in FIG. 6, a processing speed v and a distance L were adjusted so that the time T (=L/v) required for a recording medium to reach the multi-stylus electrode assembly after being preliminarily charged was between 0 and 3 seconds. Three recording media having intermediate resistance layer surface resistances (∂) of $4 \times 10^6$ ohms per unitary area, $2 \times 10^7$ ohms per unitary area and $5 \times 10^7$ ohms per unitary area were subjected to a voltage of $-6$ KV, as a result of which the potential differences ΔV between the central portions and the end portions of these recording media were as indicated by curves a, b and c in FIG. 7.

Figure 8:
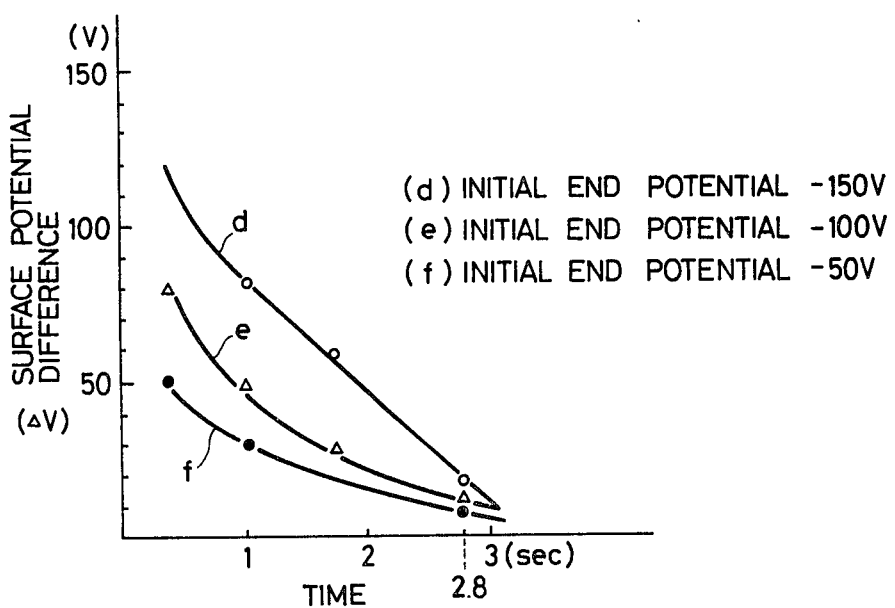
FIG. 8 is a graphical representation indicating differences in surface potential with time when the surface potential at the end portion of the recording medium is varied.

The voltage applied to the recording medium having the intermediate resistance layer with the surface resistance of $5 \times 10^7$ ohms per unitary area, whose potential difference was largest, was changed in such a manner that, with the surface potential at the end portion maintained at $-150$ V, $100$ V and $-50$ V, the charging time was varied between 0 and 3 seconds. As a result, the potential difference ΔV was changed as indicated by the curves d, e and f in FIG. 8.

Based on these results, the recording medium having the intermediate resistance layer surface resistance of $5 \times 10^7$ ohms per unitary area was employed. The recording medium feeding speed was set to 60 mm/sec, the recording medium was charged so that the potential at the end portion in the lateral direction was $-50$ V, and the distance between the preliminarily charged portion and the multi-stylus electrode assembly was set to 18 cm (T=3 seconds). In this case, the surface potential immediately below the multi-stylus electrode assembly was $-50$ V at the end portion and $-40$ V at the central portion (the potential difference ΔV=10 V).

Under this condition, a signal voltage $-350$ V was applied to the auxiliary electrodes of the multi-stylus electrode assembly, while a signal voltage of $+300$ V was applied to the charging electrodes. Then, the recording medium was subjected to development with toner powder, and the resultant image was transferred and then fixed onto an ordinary sheet. The difference in density between the central portion and the end portion of the image thus treated which corresponded to the central portion and the end portion of the recording medium was examined and found to be $\Delta ID \approx 0.001$, thus being negligible.

Next, the distance D was set to 60 mm to have T=1 second. The surface potential of the recording medium was $-50$V at the end portion and 0V at the central portion (the potential difference ΔV=50 V). In this case, the image density difference ΔID was 0.2; that is, the image was considerably lower in density in the central position.

In the cases where the time T was set to more than 3 seconds, the image density difference ΔID was smaller than 0.001, i.e. it was scarcely detected.

As is apparant from the above description, by providing a long enough period of time between the preliminary charging time and the signal application time to prevent the occurrence of irregular density in the development, the preliminarily charged potential is stabilized, so that the difference in potential between the end portion and the central portion of the recording medium is not more than 10 V. Accordingly, when an image is obtained by developing with toner an electrostatic latent image formed by the multi-stylus electrode assembly and by fixing it, the difference in density between the portions of the image thus obtained which correspond to the central and end portions of the recording medium is eliminated or at least negligibly small.

What is claimed is:

1. An electrostatic image forming method comprising the following steps: passing a multi-stylus electrode assembly, having charging electrodes and having auxiliary electrodes covered with an insulating material, over the surface of an electrostatic recording medium during relative movement between said assembly and recording medium at an electrode assembly location, generating a potential between said charging and auxiliary electrodes, precharging said recording medium surface to a precharge potential at a location prior to said assembly along said recording medium, said precharge potential having a non-uniform distribution across said recording medium varying by at least approximately 50%, and controlling the distance L between said precharging location and said electrode assembly location and the speed v of relative movement of said assembly and recording medium for reducing the voltage differential of said preliminary charge across said recording medium surface at said electrode assembly location to approximately 20%.

2. The method as claimed in claim 1, wherein said recording medium has a surface precharge at said electrode assembly location which differs by no more than approximately 10 volts along a line extending across said medium in a direction substantially parallel to said charging electrodes.

3. The method as claimed in claim 1 wherein said distance L and speed v are controlled such that (L/v) is greater than approximately 2 seconds.

4. The method as claimed in claim 1, wherein said precharging step comprises precharging said medium to one polarity and said generating step comprises applying an opposite polarity voltage to said charging electrodes.

* * * * *